United States Patent
Kumar et al.

(10) Patent No.: US 9,603,170 B2
(45) Date of Patent: *Mar. 21, 2017

(54) METHOD AND APPARATUS FOR A SMART RANDOM ACCESS PROCEDURE IN A TELECOMMUNICATION NETWORK

(71) Applicant: QUALCOMM Incorporated, San Diego, CA (US)

(72) Inventors: Arvindhan Kumar, San Diego, CA (US); Luna Sapna D'Souza, San Diego, CA (US); Chetan Gopalakrishnan Chakravarthy, San Diego, CA (US); Guruvayurappan Vasudevan, Hyderabad (IN); Vaishakh Rao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/981,648

(22) Filed: Dec. 28, 2015

(65) Prior Publication Data

US 2016/0113035 A1 Apr. 21, 2016

Related U.S. Application Data

(63) Continuation of application No. 14/077,789, filed on Nov. 12, 2013, now Pat. No. 9,271,310.

(Continued)

(51) Int. Cl.
*H04W 4/00* (2009.01)
*H04W 74/08* (2009.01)
(Continued)

(52) U.S. Cl.
CPC ......... *H04W 74/085* (2013.01); *H04L 5/0055* (2013.01); *H04W 72/02* (2013.01);
(Continued)

(58) Field of Classification Search
CPC ................................................. H04W 74/0875
See application file for complete search history.

(56) References Cited

U.S. PATENT DOCUMENTS

| | | |
|---|---|---|
| 2010/0182974 A1 | 7/2010 | Barraclough et al. |
| 2011/0019655 A1 | 1/2011 | Hakola |

(Continued)

FOREIGN PATENT DOCUMENTS

| | | |
|---|---|---|
| WO | WO-2010124228 A2 | 10/2010 |
| WO | WO-2013023834 A1 | 2/2013 |
| WO | WO-2013026184 A1 | 2/2013 |

OTHER PUBLICATIONS

International Search Report and Written Opinion—PCT/US2014/021257—ISA/EPO—Jun. 3, 2014.

(Continued)

*Primary Examiner* — Joseph Bednash
*Assistant Examiner* — Kevin Cunningham
(74) *Attorney, Agent, or Firm* — Loza & Loza LLP

(57) ABSTRACT

Aspects of the present disclosure provide for a method and an apparatus for wireless communications using an intelligent Random Access Channel (RACH) procedure that may increase the probability of obtaining an available E-DCH resource quickly in a Universal Mobile Telecommunication System.

12 Claims, 10 Drawing Sheets

Related U.S. Application Data

(60) Provisional application No. 61/807,226, filed on Apr. 1, 2013.

(51) Int. Cl.
*H04L 5/00* (2006.01)
*H04W 72/02* (2009.01)

(52) U.S. Cl.
CPC ... *H04W 74/0833* (2013.01); *H04W 74/0875* (2013.01); *H04W 74/0866* (2013.01)

(56) References Cited

U.S. PATENT DOCUMENTS

| | | |
|---|---|---|
| 2011/0274040 A1 | 11/2011 | Pani et al. |
| 2012/0250659 A1 | 10/2012 | Sambhwani |
| 2013/0114518 A1 | 5/2013 | Martin et al. |
| 2013/0208668 A1 | 8/2013 | Ramos et al. |
| 2014/0153554 A1 | 6/2014 | He et al. |
| 2014/0286320 A1 | 9/2014 | He |
| 2014/0293887 A1* | 10/2014 | Kumar ............. H04W 74/0833 370/329 |

OTHER PUBLICATIONS

3GPP TS 25.211: "3rd Generation Partnership Project; Universal Mobile Telecommunications System (UMTS); Physical channels and mapping of transport channels onto physical channels (FDD)," ETSI TS 125 211, Version 8.7.0, Release 8, Oct. 2010, 59 Pages.

* cited by examiner

| X = 0 | SIG IND = 0, 4 | Usable Y, N | Probability |
| X = 1 | SIG IND = 1, 5 | Usable Y, N | Probability |
| X = 2 | SIG IND = 2, 6 | Usable Y, N | Probability |
| X = 3 | SIG IND = 3, 7 | Usable Y, N | Probability |

US 9,603,170 B2

METHOD AND APPARATUS FOR A SMART RANDOM ACCESS PROCEDURE IN A TELECOMMUNICATION NETWORK

CROSS-REFERENCE TO RELATED APPLICATIONS

This application is a continuation of nonprovisional patent application Ser. No. 14/077,789, filed in the United States Patent and Trademark Office on Nov. 12, 2013, which claims priority to and the benefit of provisional patent application No. 61/807,226 filed in the United States Patent and Trademark Office on 1 Apr. 2013, the entire contents of both of which are incorporated herein by reference.

TECHNICAL FIELD

Aspects of the present disclosure relate generally to wireless communication systems, and more particularly, to a method and apparatus for random access procedure in Universal Mobile Telecommunication System (UMTS).

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

In many wireless networks (e.g., UMTS), a connection between a user equipment (UE) and the network can transition among different states. In UMTS, a UE can transition from a state where a dedicated channel is assigned to the UE to one or more various standby states or an idle state. When the UE transitions to the state to acquire a dedicated channel, the UE may start a random access procedure by randomly selecting an available signature sequence out of a fixed number of sequences, and may transmit a preamble modulated with the selected signature sequence on a physical random access channel (PRACH). However, the randomly selected signature sequence may not always correspond to an available dedicated channel.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide for a method and an apparatus for wireless communications using an intelligent Random Access Channel (RACH) procedure that may increase the probability of obtaining an available E-DCH resource quickly.

In one aspect, the disclosure provides a method of operating an apparatus in a wireless communications network. The method includes: creating a database comprising a plurality of resource indexes and corresponding preamble signature sequences and probabilities of being usable, the resource indexes initially marked as usable and corresponding to a plurality of uplink transport channel resources; selecting a first index of the resource indexes; selecting a first preamble signature sequence of the preamble signature sequences corresponding to the first index; initiating a random access channel (RACH) procedure by transmitting a preamble utilizing the first preamble signature sequence; marking the first index with a lower probability of being usable for a subsequent RACH procedure in connection with receiving a negative acknowledgement for the preamble; selecting a second index of the resource indexes having a probability higher than that of the first index; selecting a second preamble signature sequence of the preamble signature sequences corresponding to the second index; and transmitting a preamble utilizing the second preamble signature sequence.

Another aspect of the disclosure provides an apparatus for wireless communications. The apparatus includes: at least one processor, a communication interface coupled to the at least one processor, and a memory coupled to the at least one processor. The at least one processor is configured to create a database comprising a plurality of resource indexes and corresponding preamble signature sequences and probabilities of being usable, the resource indexes initially marked as usable and corresponding to a plurality of uplink transport channel resources; to select a first index of the resource indexes; to select a first preamble signature sequence of the preamble signature sequences corresponding to the first index; to initiate a random access channel (RACH) procedure by transmitting a preamble utilizing the first preamble signature sequence; to mark the first index with a lower probability of being usable for a subsequent RACH procedure in connection with receiving a negative acknowledgement for the preamble; to select a second index of the resource indexes having a probability higher than that of the first index. index; to select a second preamble signature sequence of the preamble signature sequences corresponding to the second index; and to transmit a preamble utilizing the second preamble signature sequence.

Another aspect of the disclosure provides a non-transitory computer-readable storage medium. The computer-readable storage medium includes code for causing a user (UE) to create a database comprising a plurality of resource indexes and corresponding preamble signature sequences and probabilities of being usable, the resource indexes initially marked as usable and corresponding to a plurality of uplink transport channel resources; to select a first index of the resource indexes; to select a first preamble signature sequence of the preamble signature sequences corresponding to the first index; to initiate a random access channel (RACH) procedure by transmitting a preamble utilizing the first preamble signature sequence; to mark the first index with a lower probability of being usable for a subsequent RACH procedure in connection with receiving a negative acknowledgement for the preamble; to select a second index of the resource indexes having a probability higher than that of the first index; to select a second preamble signature sequence of the preamble signature sequences corresponding to the second index; and to transmit a preamble utilizing the second preamble signature sequence.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
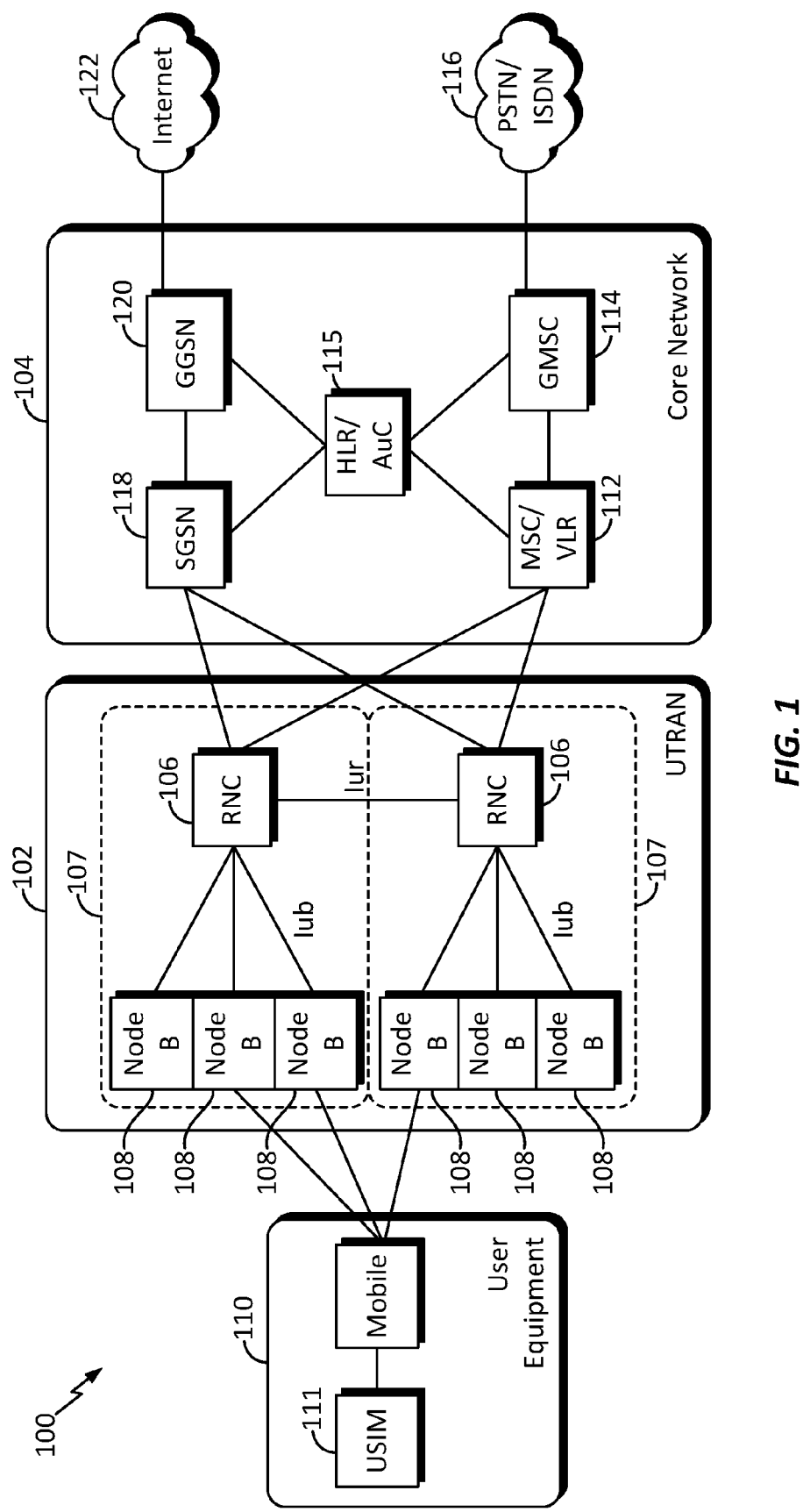
FIG. 1 is a block diagram conceptually illustrating an example of a telecommunications system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a Universal Mobile Telecommunications System (UMTS) system 100. A UMTS network includes three interacting domains: a core network 104, a radio access network (RAN) (e.g., the UMTS Terrestrial Radio Access Network (UTRAN) 102), and a user equipment (UE) 110. Among several options available for a UTRAN 102, in this example, the illustrated UTRAN 102 may employ a W-CDMA air interface for enabling various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the illustrated RNCs 106 and RNSs 107. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 110 may further include a universal subscriber identity module (USIM) 111, which contains a user's subscription information to a network. For illustrative purposes, one UE 110 is shown in communication with a number of the Node Bs 108. The downlink (DL), also called the forward link, refers to the communication link from a Node B 108 to a UE 110 and the uplink (UL), also called the reverse link, refers to the communication link from a UE 110 to a Node B 108.

The core network 104 can interface with one or more access networks, such as the UTRAN 102. As shown, the core network 104 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 104 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched an packet-switched domains.

In the illustrated example, the core network 104 supports circuit-switched services with a MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 102 is based on such DS-CDMA technology and additionally calls for a frequency division duplexing (FDD). FDD uses a different carrier frequency for the uplink (UL) and downlink (DL) between a Node B 108 and a UE 110. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

Figure 2:
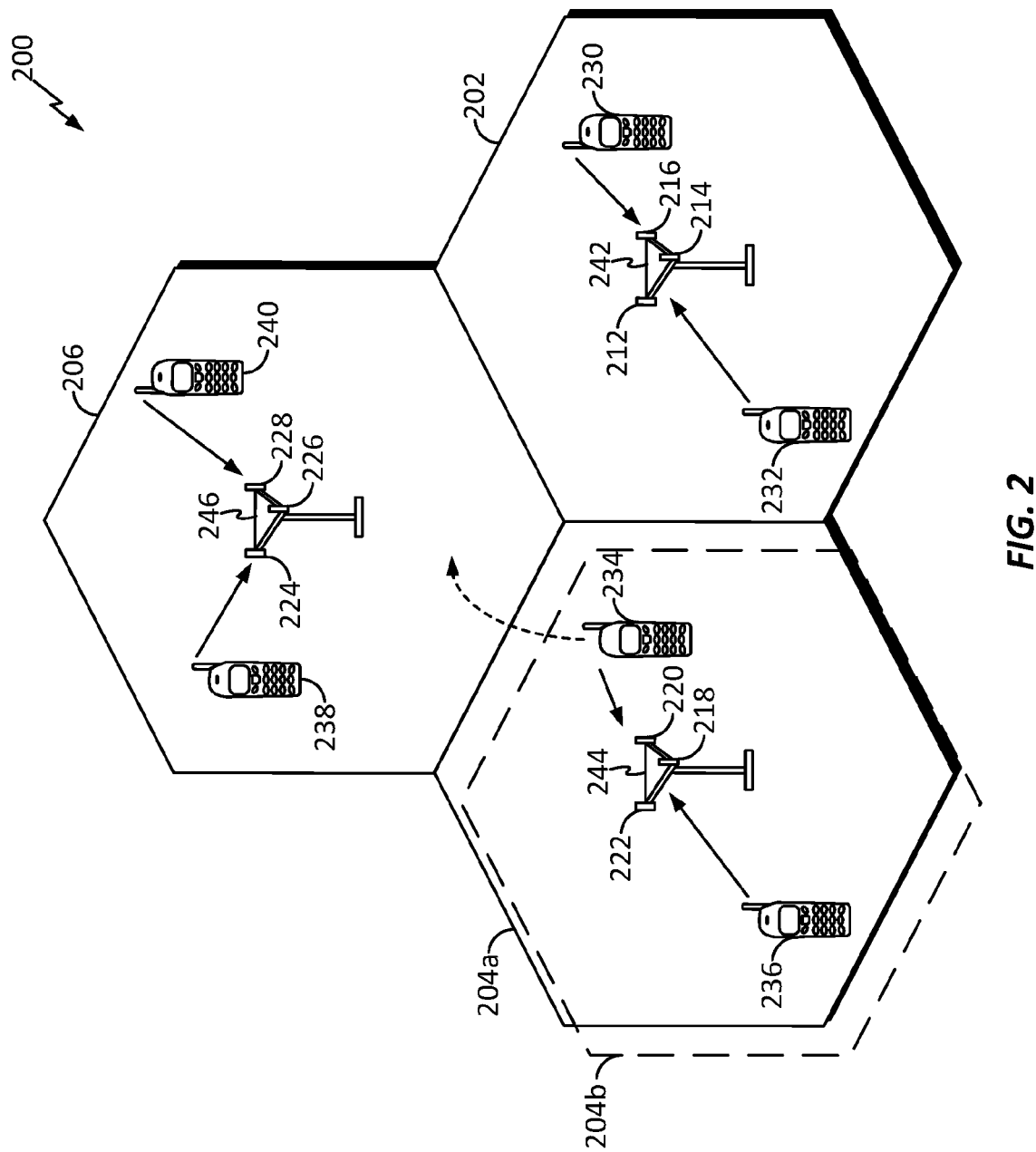
FIG. 2 is a conceptual diagram illustrating an example of an access network.

The UTRAN 102 is one example of a RAN that may be utilized in accordance with the present disclosure. Referring to FIG. 2, by way of example and without limitation, a simplified schematic illustration of a RAN 200 in a UTRAN architecture is illustrated. The system includes multiple cellular regions (cells), including cells 202, 204, and 206, each of which may include one or more sectors. Cells may be defined geographically (e.g., by coverage area) and/or may be defined in accordance with a frequency, scrambling code, etc. That is, the illustrated geographically-defined cells 202, 204, and 206 may each be further divided into a plurality of cells, e.g., by utilizing different scrambling codes. For example, cell 204a may utilize a first scrambling code, and cell 204b, while in the same geographic region and served by the same Node B 244, may be distinguished by utilizing a second scrambling code.

In a cell that is divided into sectors, the multiple sectors within a cell can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 may each correspond to a different sector. In cell 206, antenna groups 224, 226, and 228 may each correspond to a different sector.

The cells 202, 204, and 206 may include several UEs that may be in communication with one or more sectors of each cell 202, 204, or 206. For example, UEs 230 and 232 may be in communication with Node B 242, UEs 234 and 236 may be in communication with Node B 244, and UEs 238 and 240 may be in communication with Node B 246. Here, each Node B 242, 244, and 246 may be configured to provide an access point to a core network 204 (see FIG. 2) for all the UEs 230, 232, 234, 236, 238, and 240 in the respective cells 202, 204, and 206.

During a call with a source cell, or at any other time, the UE 236 may monitor various parameters of the source cell as well as various parameters of neighboring cells. Further, depending on the quality of these parameters, the UE 236 may maintain communication with one or more of the neighboring cells. During this time, the UE 236 may maintain an Active Set, that is, a list of cells to which the UE 236 is simultaneously connected (i.e., the UTRAN cells that are currently assigning a downlink dedicated physical channel DPCH or fractional downlink dedicated physical channel F-DPCH to the UE 236 may constitute the Active Set).

A high speed packet access (HSPA) air interface includes a series of enhancements to the 3G/W-CDMA air interface between the UE 110 and the UTRAN 102, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL). In HSUPA, the Enhanced Dedicated Channel (E-DCH) may be used to carry user data in the uplink direction. The E-DCH transport channel includes two channels: E-DPDCH to carry user data and E-DPCCH to carry the physical layer uplink control information.

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 110 and the core network 104 (referring to FIG. 1), and may include circuit switched and packet switched protocols. The AS provides the lower layers, for signaling between the UTRAN 102 and the UE 110, and may include a user plane and a control plane. Here, the user plane or data plane carries user traffic, while the control plane carries control information (i.e., signaling).

Figure 3:
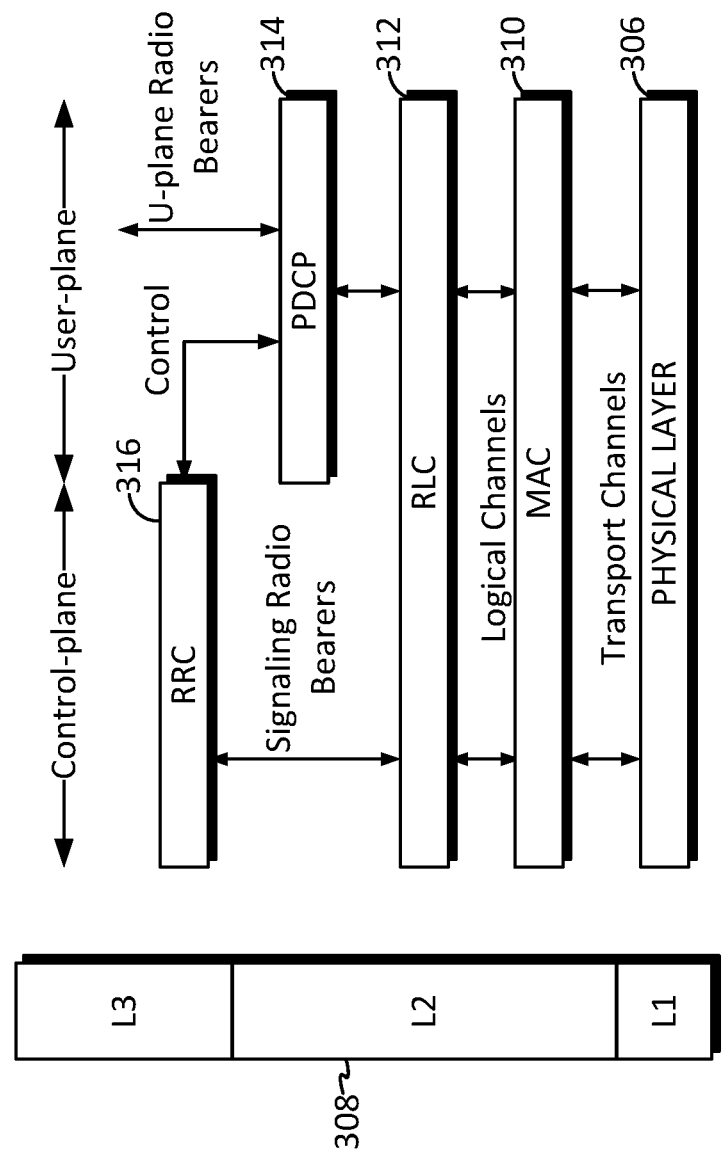
FIG. 3 is a conceptual diagram illustrating an example of a radio protocol architecture for the user and control plane.

Turning to FIG. 3, the AS is shown with three layers: Layer 1, Layer 2, and Layer 3. Layer 1 is the lowest layer and implements various physical layer signal processing functions. Layer 1 will be referred to herein as the physical layer 306. The data link layer, called Layer 2 308, is above the physical layer 306 and is responsible for the link between the UE 110 and Node B 108 over the physical layer 306.

At Layer 3, the RRC layer 316 handles the control plane signaling between the UE 110 and the Node B 108. RRC layer 316 includes a number of functional entities for routing higher layer messages, handling broadcasting and paging functions, establishing and configuring radio bearers, etc.

In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Although not shown, the UE may have several upper layers above the L2 layer 308 including a network layer (e.g., IP layer) that is terminated at a PDN gateway on the network side and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations. In HSUPA, both the UE and the RNC include additional MAC functionalities. For example, on the UE side, the new functionality represents the uplink scheduling and retransmission handling (being controlled by the MAC-e in Node B). The MAC-es functionality in the RNC is to cover for packet re-ordering to avoid changes to the layers above. This reordering is needed because the packets may arrive out of sequence from different base stations.

Figure 4:
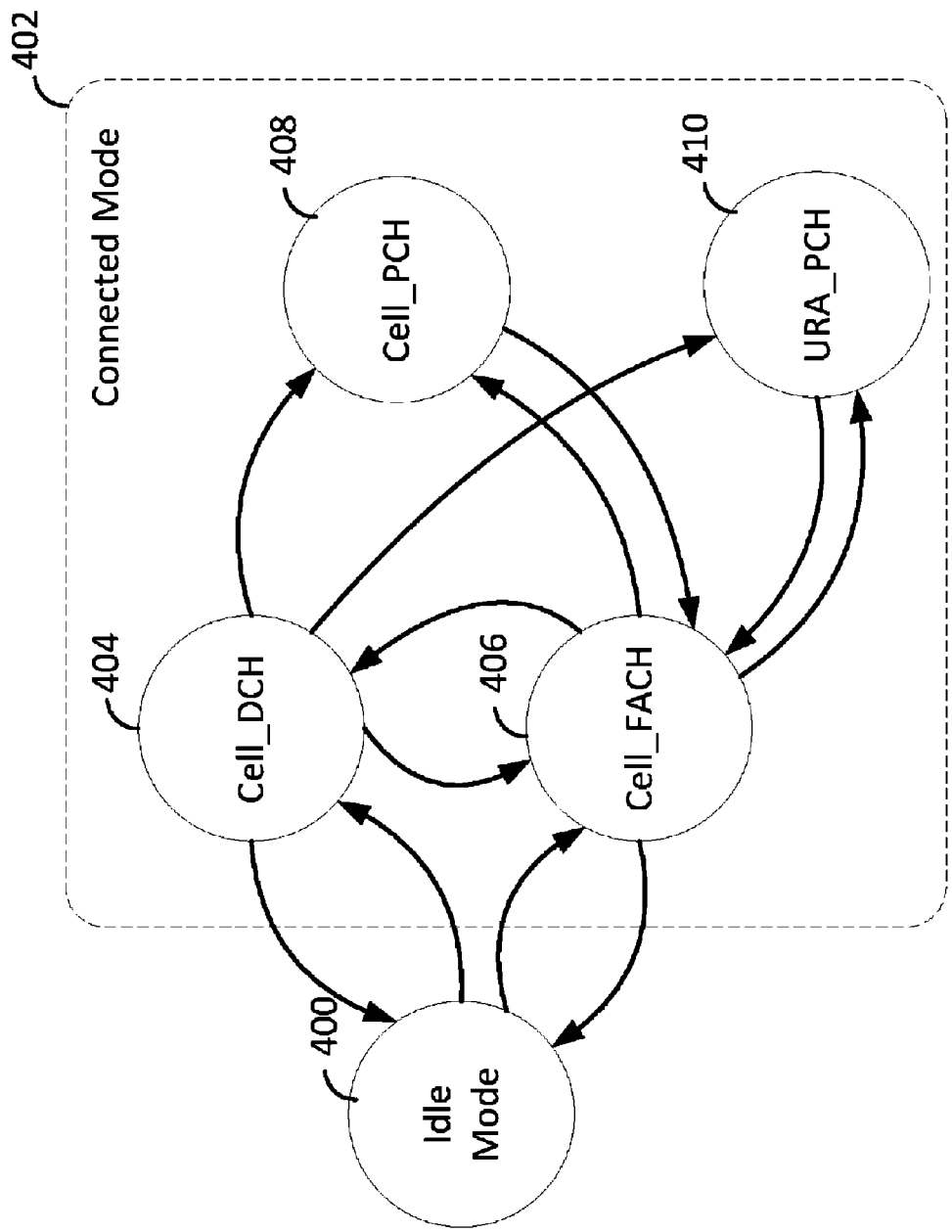
FIG. 4 is a state diagram illustrating the operational modes of an UE in a UMTS network as shown in FIG. 1.

FIG. 4 is a state diagram illustrating the operational modes of the UE 110 in, for example, the UMTS network 100 as described above. Two basic operational modes of the UE 110 are idle mode and connected mode. The connected mode can be further divided into a number of service states, which define what kind of physical channels the UE 110 is using. FIG. 4 shows the main RRC service states in the connected mode. It also shows the transitions between an idle mode 400 and a connected mode 402 and the possible transitions within the connected mode. In the idle mode 400, the UE 110 is able to receive system information and cell broadcast (CB) messages. The UE 110 stays in the idle mode 400 until it transmits a request to establish an RRC connection. In the idle mode 400, the UTRAN 102 has no information of its own about the individual idle-mode UEs and can only address, for example, all UEs in a cell or all UEs monitoring a paging occasion.

In the connected mode 402, the UE 110 may be in one of a Cell_DCH state 404, a Cell_FACH state 406, a Cell PCH_state 408, and a URA_PCH state 410. In the Cell_DCH state 404, a dedicated physical channel is allocated to the UE 110, and the UE 110 is known by its serving RNC on a cell or active set level. In the Cell_FACH state 406, no dedicated physical channel is allocated for the UE 110, but random access channels (RACHs) and forward access channels (FACHs) are used instead, for transmitting both signaling messages and small amounts of user-plane data. The UE's power consumption is typically less in the Cell_FACH state 406 than that of the Cell_DCH state 404.

In the Cell_PCH state 410, the UE 110 is still known on a cell level in the serving RNC (SRNC), but it can be reached only via the paging channel (PCH). In this state, the UE's battery consumption is less than that of the Cell_DCH state 404 and/or the Cell_FACH state 406 since the monitoring of the PCH includes a discontinuous reception (DRX) functionality. If the UE 110 performs a cell reselection, then it moves autonomously to the Cell_FACH state 406 to execute the Cell Update procedure, after which it re-enters the Cell_PCH state 410 if no other activity is triggered during the Cell Update procedure. If a new cell is selected from another radio access system, then the RRC state is changed to the idle mode 400 and access to the other system is performed according to that system's specifications.

The URA_PCH state 410 is very similar to the Cell_PCH state 408, except that the UE 110 does not execute Cell Update after each cell reselection, but instead reads UTRAN Registration Area (URA) identities from the BCH, and only if the URA changes (after cell reselection) does the UE 110 inform its location to the SRNC. The power consumption of the UE 110 is typically less in the URA_PCH state 408 than that of the Cell_DCH state 404 and/or the Cell_FACH state 406.

The UE 110 leaves the connected mode and returns to the idle mode 400 when the RRC connection is released or at RRC connection failure. Transitioning the UE 110 among the above states involves exchanging control messages on the control channels. For example, the UE 110 can send a signaling connection release indication (SCRI) to the RNC 106. Based on the values of the received SCRI, the RNC 106 may command the UE 110 to use the Cell_PCH state 408 or the URA_PCH state 410, instead of releasing the RRC connection and dropping the UE 110 into the idle mode 400. In another example, the RNC 106 can command the UE 110 to drop to the idle mode 400 directly from the Cell_DCH state 404.

In the idle mode 400, the UE 110 can transition to the Cell_DCH state 404 or Cell_FACH state 406. This transition from the idle mode 400 is initiated by an RRC connection request. This step involves setting up the necessary radio access bearers (RABs). Transitions from the Cell_FACH state 406 or Cell_DCH state 404 to the Cell_PCH state 408 involves tearing down radio access bearers that have been allocated. A transition from the Cell_DCH state 404 to the Cell_FACH state 406 involves withdrawing the power and code allocated. When the UE 110 is in the Cell_DCH state 404, the UE 110 consumes more energy than the other states to keep the connection going in the DCH state.

In many wireless networks (e.g., UMTS), a connection can be transitioned from the Cell_DCH state 404 to the Cell_FACH state 406 to reduce power consumption under certain conditions, but data throughput in the Cell_FACH state 406 is lower than that of the Cell_DCH state 404. However, the amount of energy required on the UE's side can still be significant in the Cell_FACH state 406. Therefore, the UE 110 can be transitioned from the Cell_DCH state 404 and Cell_FACH 406 to an even lower energy consuming state, such as the Cell_PCH state 408, the URA_PCH state 410, or back to the idle mode 400.

The 3GPP Specification Release 7 and Release 8 introduced the Enhanced Cell_FACH state to improve the end user performance and system efficiency by utilizing HSPA transport and physical channels in the Cell_FACH state. The state transition from Enhanced Cell_FACH (hereafter may be referred to as "Cell_FACH") to Cell_DCH is practically seamless because the physical channel is not changed. In the Cell_FACH state, the E-DCH transport channel is used for uplink transmission. E-DCH resources and initial data rate allocation to be used in the Cell_FACH state are broadcast to the cell.

Figure 5:
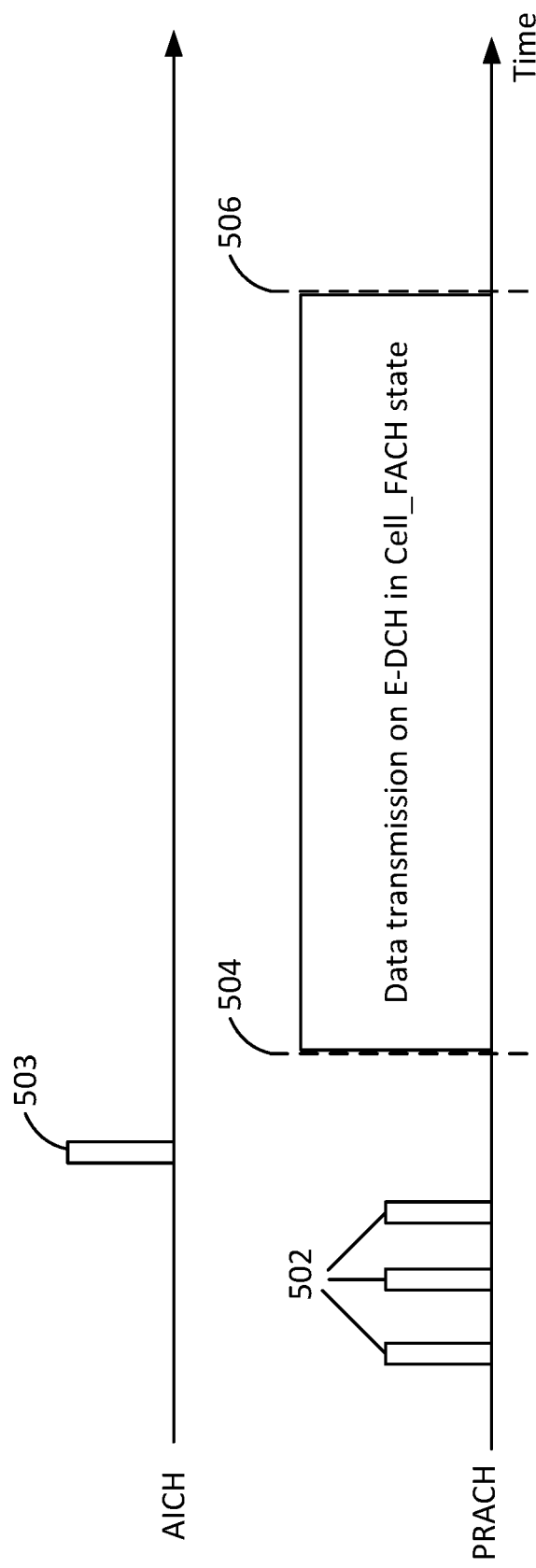
FIG. 5 is a conceptual diagram illustrating data transmission for initiating a RACH procedure using an E-DCH in an enhanced Cell_FACH state.

FIG. 5 is a conceptual diagram illustrating data transmission for initiating a RACH procedure using an E-DCH in the Enhanced Cell_FACH state. In a UMTS system 100, a UE 110 starts a RACH procedure to initiate uplink transmission. The RACH is typically used for signaling purposes, to register the UE 110 after power-on to the network or to perform location update after moving from one location area to another or to initiate a call. To initiate the RACH procedure, the UE 110 randomly selects an available signature sequence and transmits one or more preambles 502 modulated with the selected signature sequence on a physical random access channel (PRACH). For example, sixteen signature sequences have been specified for RACH use in the UMTS standards. The preambles are sent prior to data transmission. These use a spreading factor of 256 and contain a signature sequence of 16 symbols, resulting in a total length of 4096 chips for the preamble. The UE 110 decodes an Acquisition Indicator Channel (AICH) to determine whether a base station has detected the preamble 502. When the network detects the preamble 502, an AICH preamble 503 is transmitted on the AICH. The AICH carries Acquisition Indicators (AI) that correspond to signatures on the PRACH. The AICH uses an identical signature sequence as the RACH on one of the downlink channelization codes of the base station to which the RACH belongs. Once the base station has detected the preamble with the random access attempt, then the same signature sequence that has been used on the preamble will be echoed back on AICH. At the point of preamble acquisition 504, a Node B 108 points the UE 110 to a specific E-DCH resource with AICH. At the time point 506, the UE 110 may end data transmission or moves to the Cell_DCH state to continue data transmission.

With enhanced Cell_FACH in UL (a.k.a. HSRACH), the network may allocate a subset of the sixteen available RACH signature sequences dedicated for HSUPA users in the enhanced Cell_FACH state. The network also allocates "Y" number of common E-DCH resources (e.g., E-DCH channels) for such enhanced UL users in the Cell_FACH state. Without the availability of an enhanced AICH (E-AICH) configuration, the network can only assign a default common E-DCH resource index for a user. For more detail, see 3GPP specification 25.211, which is incorporated herein in its entirety. The association between the Acquisition Indicator of the AICH and the default E-DCH resource index is defined by equation (1) below.

$$X = \text{SigInd} \bmod Y \qquad (1)$$

In equation (1), X is the default E-DCH resource index, Y is the total number of E-DCH resources configured in the cell for UL use in the Enhanced Cell_FACH state and Idle mode, and SigInd is the signature index corresponding to the PRACH preamble signature (indicated by AI) that is configured to be available in the cell and corresponding to E-DCH transmission for Enhanced Uplink in Cell_FACH state and Idle mode, counting from zero and taking into account only the PRACH preamble signature indexes that are configured available in the cell and corresponding to E-DCH transmission for Enhanced Uplink in Cell_FACH state and Idle mode.

The above equation (1) ties the available signatures for HS-RACH users to a particular common E-DCH resource index. While a UE 110 starts a RACH procedure, it picks an RACH preamble signature sequence randomly from the available ones. As such, every signature sequence has an equal probability to be selected by the UE at a given instant, and the probability of the UE selecting an available common E-DCH resource from the network can be represented as a ratio defined by equation (2).

$$\frac{\text{Number of signatures for that particular resource}}{\text{Number of available signatures}} \qquad (2)$$

In some scenarios, the common E-DCH resource selected by the signature index may not be available. Therefore, this may potentially delay the probability of getting an available common E-DCH resource from the network, as the RACH preamble signatures are picked randomly with equal probability.

Aspects of the present disclosure provide an intelligent random access channel (RACH) procedure in Enhanced Cell_FACH. Instead of selecting the RACH preamble signature randomly, a UE 110 maintains a database of available common E-DCH resources and the set of RACH preamble signature sequences that are tied to each of the E-DCH resources.

Figure 6:
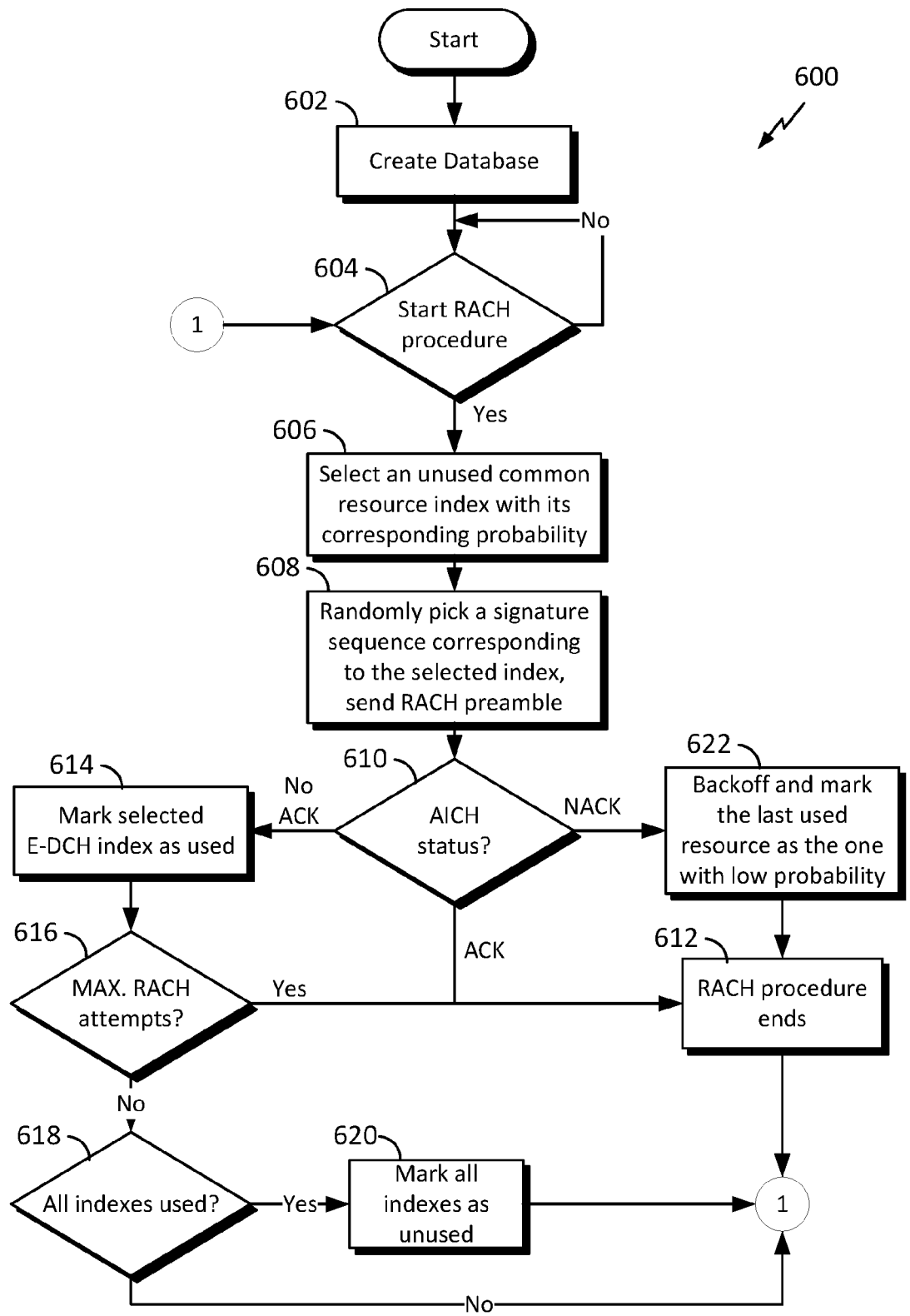
FIG. 6 is a flow chart illustrating an algorithm for performing an RACH access procedure in accordance with aspects of the present disclosure.
Figure 7:
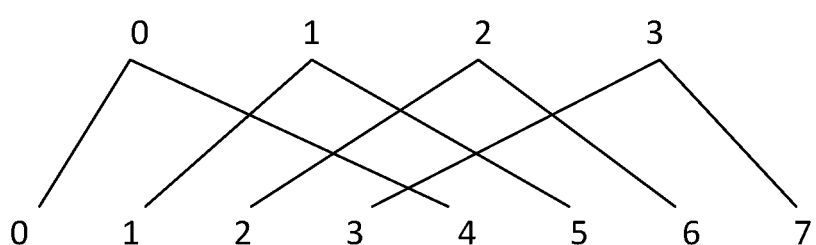
FIG. 7 is a conceptual diagram illustrating a database that may be used in the algorithm of FIG. 6 in accordance with an aspect of the disclosure.

FIG. 6 is a flow chart illustrating an algorithm 600 for performing an RACH access procedure in accordance with aspects of the present disclosure. The algorithm 600 may be performed using the UE 110 with the UTRAN 102 (see FIG. 1). Referring to FIG. 6, in step 602, the UE 110 operable in a wireless communications network (e.g., UMTS system 100) is configured to create a database that contains information pertaining to common E-DCH resources available for HSRACH users and their corresponding RACH signature sequences. FIG. 7 is a conceptual diagram illustrating a database 700 that may be used in the algorithm 600 in accordance with an aspect of the disclosure. In this example, four common E-DCH resources (denoted as X=0, 1, 2, or 3) are allocated for HSRACH users. Each of the E-DCH 702 resources is mapped to a corresponding preamble signature index (SIG IND) 704. Here, each of the signature indexes denotes a corresponding RACH signature sequence. In this example, the E-DCH resource X=0 is mapped to the signature indexes 0 and 4; the E-DCH resource X=1 is mapped to the signature indexes 1 and 5; the E-DCH resource X=2 is mapped to the signature indexes 2 and 6; and the E-DCH resource X=3 is mapped to the signature indexes 3 and 7. Each of the E-DCH resources in the database 700 is marked as usable or not usable and has a corresponding probability of being usable. At the beginning of the process 600, the E-DCH resources may have the same probability as one another in the database 700. In other aspects of the disclosure, the network may assign different numbers of E-DCH resources for different HSRACH users, and the E-DCH resources may have the same number or different numbers of corresponding signatures.

In step 604, if the UE 110 initiates a RACH procedure, it proceeds to step 606. In step 606, the UE 110 randomly selects a common E-DCH resource index (e.g., X=0) that is marked unused based on its corresponding probability. For example, the UE 110 may select an unused E-DCH resource index in the database having a higher probability. Initially, all the E-DCH resource indexes are marked as unused (i.e., Usable=Yes) in the database 700. In step 608, the UE 110 randomly selects a signature sequence index (e.g., SIG IND=4) from the list of signature sequences (e.g., SIGN IND=0, 4) that are mapped to the selected common E-DCH resource index. Then the UE 110 requests access to the network by sending a RACH preamble (e.g., preamble 502) with the selected signature sequence.

In step 610, the UE 110 monitors the Acquisition Indictor Channel (AICH) to determine whether or not the RACH preamble is acknowledged by the network. If an Acknowledgement message (ACK) is received from the network, the RACH procedure ends in step 612, and the UE 110 may use the selected E-DCH resources to access the network. If no ACK is received from the network for the RACH preamble transmission, the UE 110 marks the selected common E-DCH resource index as unusable or used (i.e., Usable=N) in the database in step 614. For the next RACH preamble attempt, the UE 110 will select another common E-DCH resource index randomly excluding the ones already selected that are flagged as unusable in the database 700.

In step 616, the UE 110 checks whether or not the maximum number of RACH attempts is reached. In one example, the maximum number of RACH attempts may be any suitable value from 1 to 64, which is configured by the network. If the maximum number is reached, the UE 110 ends the RACH procedure in step 612 and resets all the E-DCH resource indexes as usable in the database. If the maximum number is not reached yet, the UE 110 checks whether or not all E-DCH indexes are marked as used in step 618. If all of the E-DCH resource indexes are marked as used (i.e., Usable=N), the UE 110 resets or marks all of the E-DCH indexes as unused (i.e., Usable=Y) again in step 620. Here, when each E-DCH resource index is used at least once, all of the indexes will be marked as used in the database 700, and their corresponding probabilities are reset. In one example, the initial probability may be reset to be the same for all indices.

Returning to step 610, if the UE 110 receives a Negative Acknowledgement message (NACK) from the network, the UE 110 performs a typical RACH backoff procedure in step 622 and marks this E-DCH index with a lower probability in the database 700 for the subsequent RACH procedure. In a typical RACH backoff, the UE 110 determines a suitable wait period and delays transmission of a subsequent access attempt signal for the wait period in response to an unsuccessful access attempt to the RACH. By performing the RACH procedure with the above-described algorithm 600, the procedure intelligently selects the common E-DCH resources that may increase or maximize the probability of getting an available E-DCH resource quickly.

Figure 8:
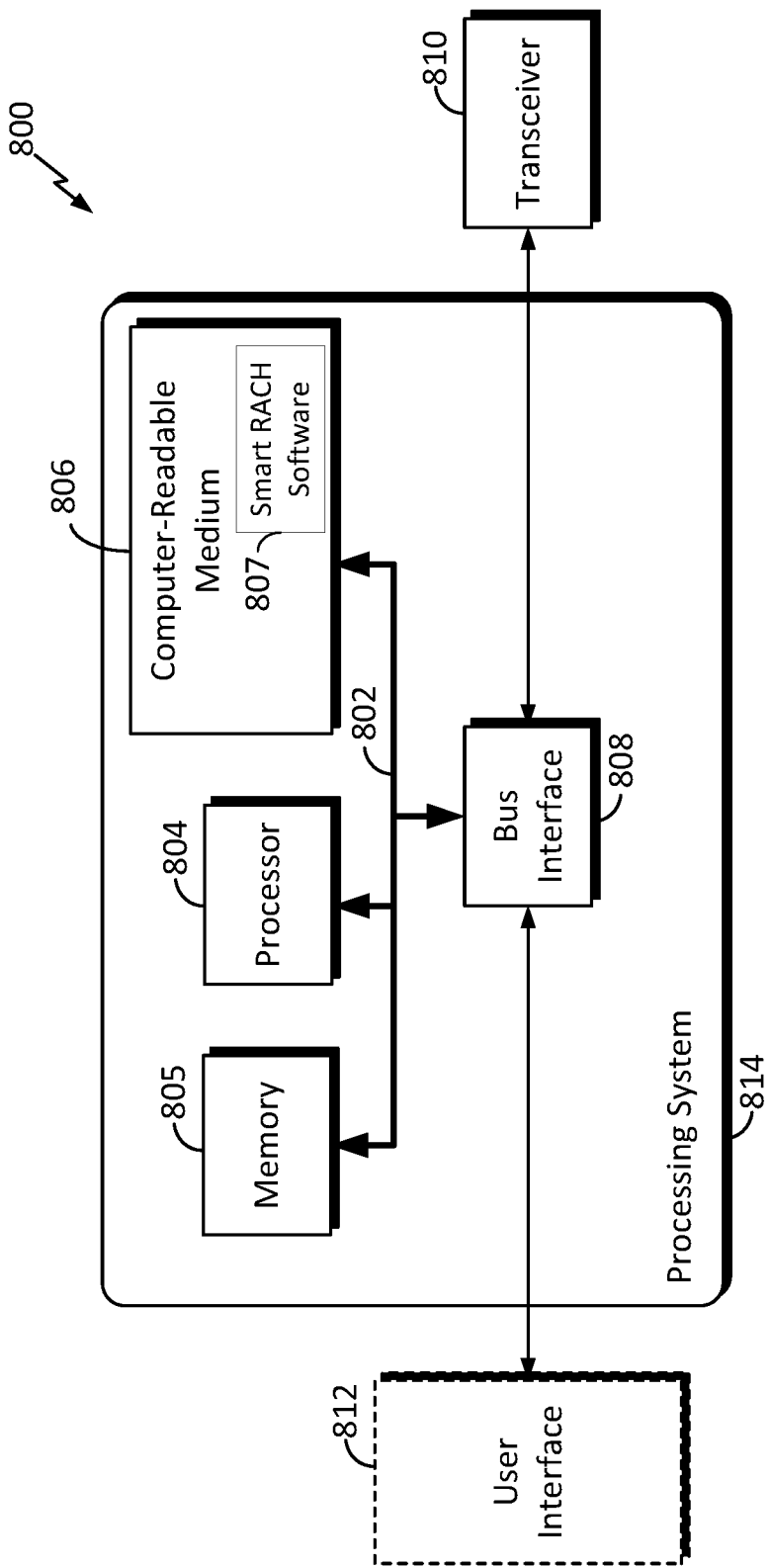
FIG. 8 is a block diagram illustrating an example of a hardware implementation for an apparatus employing a processing system.

FIG. 8 is a conceptual diagram illustrating an example of a hardware implementation for an apparatus 800 employing a processing system 814. In aspects of the disclosure, the apparatus 800 may be implemented as the UE 110 configured to perform the algorithm 600 as described above in reference to FIGS. 6 and 7. In accordance with various aspects of the disclosure, an element, or any portion of an element, or any combination of elements may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 814 may be implemented with a bus architecture, represented generally by the bus 802. The bus 802 may include any number of interconnecting buses and bridges depending on the specific application of the processing system 814 and the overall design constraints. The bus 802 links together various circuits including one or more processors (represented generally by the processor 804), a memory 805, and computer-readable media (represented generally by the computer-readable storage medium 806). The bus 802 may also link various other circuits such as timing sources, peripherals, voltage regulators, and power management circuits, which are well known in the art, and therefore, will not be described any further. A bus interface 808 provides an interface between the bus 802 and a communication interface (e.g., transceiver 810. The transceiver 810 provides a means for communicating with various other apparatus over a transmission medium. Depending upon the nature of the apparatus, a user interface 812 (e.g., keypad, display, speaker, microphone, joystick, touchscreen, touchpad) may also be provided.

The processor 804 is responsible for managing the bus 802 and general processing, including the execution of software stored on the computer-readable medium 806. The software, when executed by the processor 804, causes the processing system 814 to perform the various functions described in FIGS. 6 and 7 for the UE 110. For example, the software may include a smart RACH software 807 for causing various components and circuitry of the processor 804 to execute the algorithm 600 described above. The computer-readable medium 806 may also be used for storing data (e.g., database 700) that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 9:
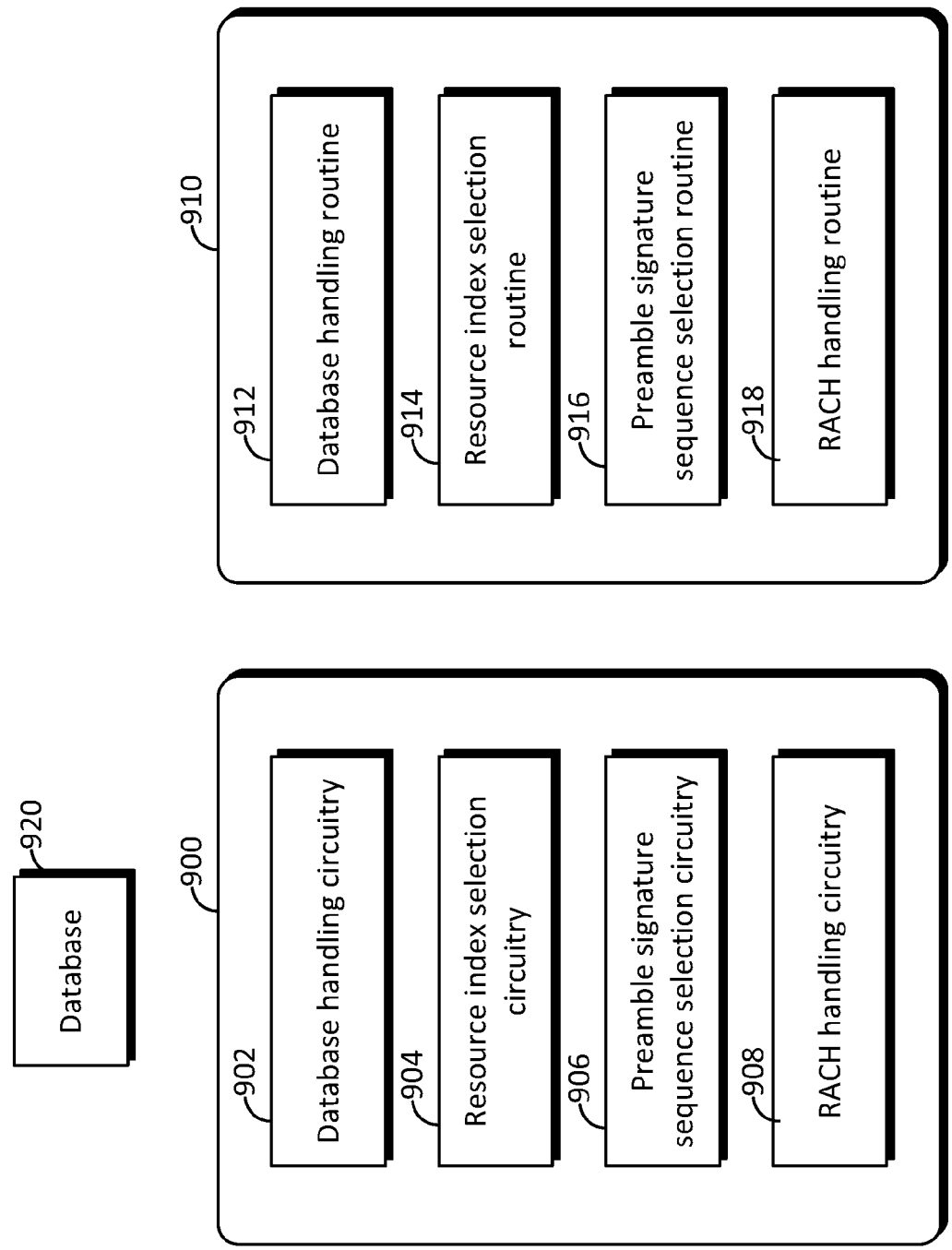
FIG. 9 is a conceptual diagram illustrating some functional blocks of a processor and a computer-readable medium in accordance with an aspect of the disclosure.

FIG. 9 is a conceptual diagram illustrating some functional blocks of a processor 900 and a computer-readable medium 910 in accordance with an aspect of the disclosure. The processor 900 may be the same as the processor 804, and the computer-readable medium 910 may be the same as the computer-readable medium 806. The processor 900 includes database handling circuitry 902, resource index selection circuitry 904, preamble signature sequence selection circuitry 906, and RACH handling circuitry 908. The computer-readable medium 910 includes a database handling routine 912, a resource index selection routine 914, a preamble signature sequence selection routine 916, and an RACH handling routine 918. The database handling circuitry 902 when configured by the database handling routine 912, can create a database 920 including a number of resource indexes and corresponding preamble signature sequences. The database 920 may be the same as the database 700. The resource indexes are initially marked as usable and correspond to a plurality of uplink transport channel resources. In an aspect of the disclosure, the uplink transport channel resources may be E-DCH resources. The resource index selection circuitry 904 when configured by the resource index selection routine 914, can select a first index (e.g., index X 702) of the resource indexes. The preamble signature sequence selection circuitry 906 when configured by the preamble signature sequence selection routine 916, can select a first preamble signature sequence (e.g., SIG IND 704) of the preamble signature sequences corresponding to the first index. The RACH handling circuitry 908 when configured by the RACH handling routine 918, can initiate an RACH procedure by transmitting a preamble utilizing the first preamble signature sequence. In addition, the various functional blocks of the processor 900 and computer-readable medium 910 may be used to perform the various functionalities described in reference to FIGS. 5-7.

Figure 10:
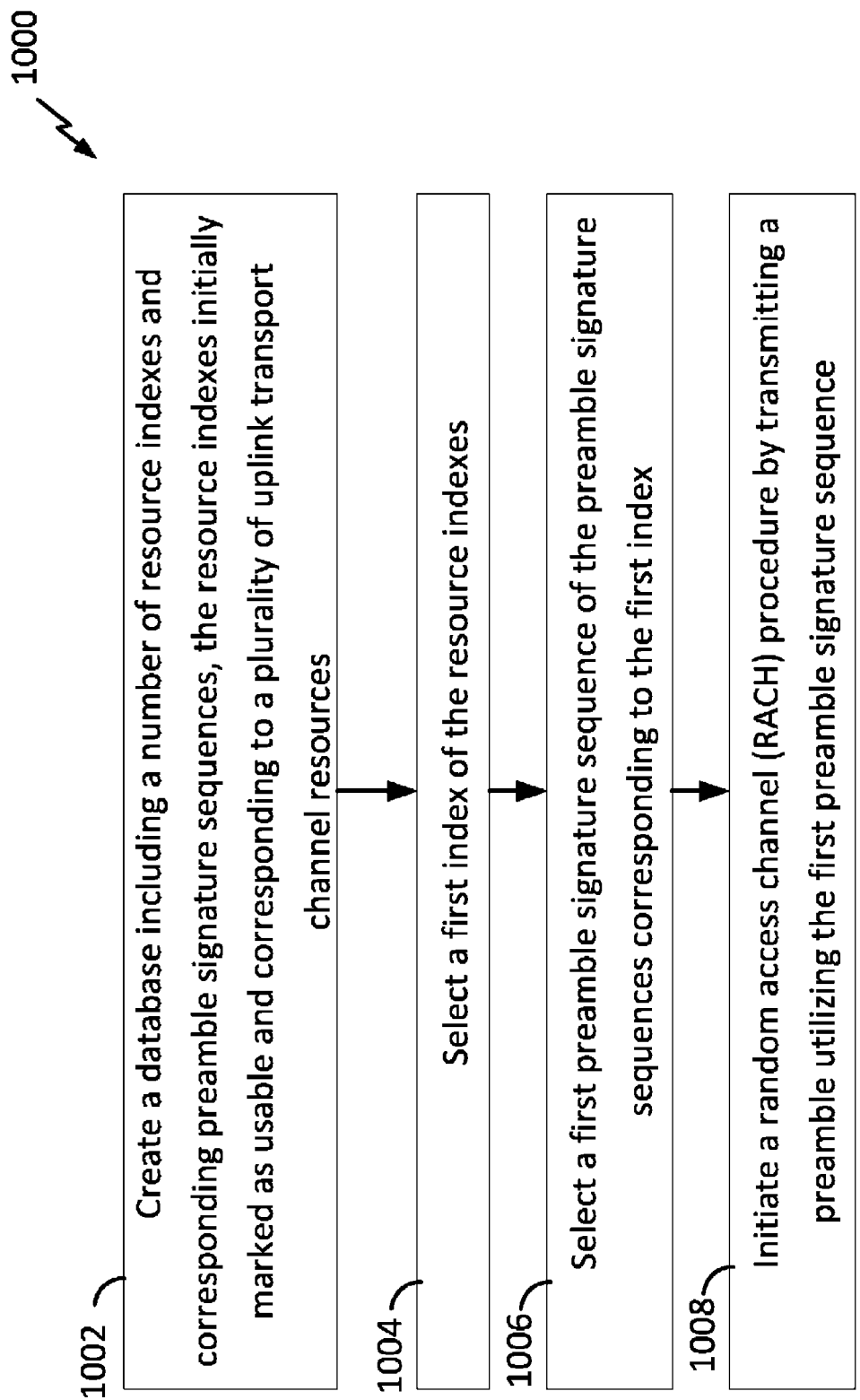
FIG. 10 is a diagram illustrating a method of operating an apparatus in a wireless communications network in accordance with an aspect of the disclosure.

FIG. 10 is a block diagram illustrating a method 1000 of operating an apparatus in a wireless communications network in accordance with an aspect of the disclosure. The apparatus may be the UE 110. In step 1002, the apparatus creates a database including a number of resource indexes and corresponding preamble signature sequences, the resource indexes initially marked as usable and corresponding to a plurality of uplink transport channel resources. For example, the resource indexes may be the E-DCH resource indexes (X=0, 1, 2, or 3) in the database 700. The apparatus may include the processor 900 that executes the database handling routine 912 to configure the database handling circuitry 902 to perform, for example, the functionalities of step 1002. In step 1004, the apparatus selects a first index of the resource indexes. For example, the processor 900 of the apparatus executes the resource index selection routine 914 to configure the resource index selection circuitry 904 to perform, for example, the functionalities of step 1004. In step 1006, the apparatus selects a first preamble signature sequence of the preamble signature sequences corresponding to the first index. For example, the preamble signature sequences correspond to the SIG INDs in the database 700.

The processor 900 of the apparatus may execute the preamble signature sequence selection routine 916 to configure the preamble signature sequence selection circuitry 906 to perform, for example, the functionalities of step 1006. In step 1008, the apparatus initiates a random access channel (RACH) procedure by transmitting a preamble (e.g., preamble 502) utilizing the first preamble signature sequence. The processor 900 of the apparatus may execute the RACH handling routine 918 to configure the RACH handling circuitry 908 to perform, for example, the functionalities of step 1008.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

The invention claimed is:

1. A method of operating an apparatus in a wireless communications network, comprising:
   creating a database comprising a plurality of resource indexes and corresponding preamble signature sequences and probabilities of being usable, the resource indexes initially marked as usable and corresponding to a plurality of uplink transport channel resources;
   selecting a first index of the resource indexes;
   selecting a first preamble signature sequence of the preamble signature sequences corresponding to the first index;
   initiating a random access channel (RACH) procedure by transmitting a preamble utilizing the first preamble signature sequence;
   marking the first index with a lower probability of being usable for a subsequent RACH procedure in connection with receiving a negative acknowledgement for the preamble;
   selecting a second index of the resource indexes having a probability higher than that of the first index;
   selecting a second preamble signature sequence of the preamble signature sequences corresponding to the second index; and
   transmitting a preamble utilizing the second preamble signature sequence.

2. The method of claim 1, wherein the uplink transport channel resources comprise a plurality of Enhanced Dedicated Channel (E-DCH) resources.

3. The method of claim 1, further comprising:
   receiving a negative acknowledgement for the preamble; and
   performing a backoff procedure of the RACH procedure.

4. The method of claim 1, wherein the selecting the first index comprises randomly selecting an index marked as usable from among the resource indexes.

5. An apparatus for a wireless communications network, comprising:
   at least one processor;
   a communication interface coupled to the at least one processor; and
   a memory coupled to the at least one processor,
   wherein the at least one processor is configured to:
      create a database comprising a plurality of resource indexes and corresponding preamble signature sequences and probabilities of being usable, the resource indexes initially marked as usable and corresponding to a plurality of uplink transport channel resources;
      select a first index of the resource indexes;
      select a first preamble signature sequence of the preamble signature sequences corresponding to the first index;
      initiate a random access channel (RACH) procedure by transmitting a preamble utilizing the first preamble signature sequence;
      mark the first index with a lower probability of being usable for a subsequent RACH procedure in connection with receiving a negative acknowledgement for the preamble;
      select a second index of the resource indexes having a probability higher than that of the first index;
      select a second preamble signature sequence of the preamble signature sequences corresponding to the second index; and
      transmit a preamble utilizing the second preamble signature sequence.

6. The apparatus of claim 5, wherein the uplink transport channel resources comprise a plurality of Enhanced Dedicated Channel (E-DCH) resources.

7. The apparatus of claim 5, wherein the at least one processor is further configured to:
   receive a negative acknowledgement for the preamble; and
   perform a backoff procedure of the RACH procedure.

8. The apparatus of claim 5, wherein for selecting the first index, the at least one processor is further configured to randomly select an index marked as usable from among the resource indexes.

9. A non-transitory computer-readable storage medium comprising:
   code for causing a user equipment (UE) to:
      create a database comprising a plurality of resource indexes and corresponding preamble signature sequences and probabilities of being usable, the resource indexes initially marked as usable and corresponding to a plurality of uplink transport channel resources;
      select a first index of the resource indexes;
      select a first preamble signature sequence of the preamble signature sequences corresponding to the first index;
      initiate a random access channel (RACH) procedure by transmitting a preamble utilizing the first preamble signature sequence;
      mark the first index with a lower probability of being usable for a subsequent RACH procedure in connection with receiving a negative acknowledgement for the preamble;
      select a second index of the resource indexes having a probability higher than that of the first index;
      select a second preamble signature sequence of the preamble signature sequences corresponding to the second index; and
      transmit a preamble utilizing the second preamble signature sequence.

10. The non-transitory computer-readable storage medium of claim 9, wherein the uplink transport channel resources comprise a plurality of Enhanced Dedicated Channel (E-DCH) resources.

11. The non-transitory computer-readable storage medium of claim 9, further comprising code for causing the UE to:
    receive a negative acknowledgement for the preamble; and
    perform a backoff procedure of the RACH procedure.

12. The non-transitory computer-readable storage medium of claim 9, further comprising code for causing the UE to:
    randomly select an index marked as usable from among the resource indexes.

* * * * *